United States Patent Office 2,921,961
Patented Jan. 19, 1960

2,921,961
UNSATURATED ETHERS OF 2-ACYL-4-AMINOPHENOLS

Erich Müller and August Kottler, Biberach (Riss), Germany, assignors to Dr. Karl Thomae G.m.b.H., Biberach (Riss), Germany, a corporation of Germany No Drawing. Application December 6, 1957
Serial No. 700,966

Claims priority, application Germany December 7, 1956

7 Claims. (Cl. 260—562)

This invention relates to unsaturated ethers of 2-acyl-4-aminophenols and various methods of producing such ethers.

More particularly, the present invention relates to ethers of 2-acyl-4-aminophenols having the general structural formula

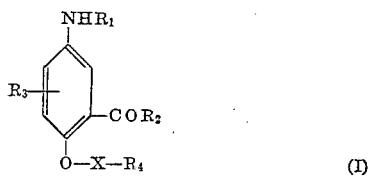

(I)

wherein X is a straight-chain or branched-chain unsaturated hydrocarbon radical with 3 to 10 carbon atoms selected from the group consisting of alkenylene and alkinylene, $R_1$ is hydrogen or an aliphatic acyl- or 2-oxy-acyl radical with 1 to 4 carbon atoms, $R_2$ is hydrogen, a straight-chain or branched-chain alkyl radical with 1 to 11 carbon atoms, or an unsubstituted or substituted aryl radical, $R_3$ is hydrogen or any desired substituent, such as halogen, alkyl, hydroxyl, alkoxy, nitro, amino, acylamino or sulfonic acid group, $R_4$ is hydrogen, halogen, alkoxy with 1 to 4 carbon atoms, acyloxy, hydroxyl, amino, alkylamino with 1 to 4 carbon atoms in the alkyl moiety, dialkylamino with 1 to 4 carbon atoms in the alkyl moieties, a heterocyclic radical or a radical having the structural formula

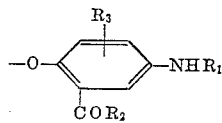

wherein $R_1$, $R_2$ and $R_3$ have the meaning defined above.

The compounds having the structural Formula I above may be produced by the following methods:

(a) By subjecting a substituted 2-acyl-4-aminophenol having the structural formula

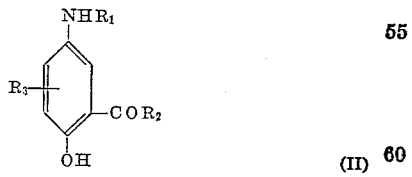

(II)

wherein $R_1$, $R_2$ and $R_3$ have the same meaning as the corresponding radicals and substituents defined in Formula I, or an alkali metal salt thereof, to an etherification reaction with a compound having the structural formula

Y—X—$R_4$  (III)

wherein Y is chlorine, bromine, iodine or tosyl (p-toluenesulfonyl), and X and $R_4$ have the meaning as in Formula I, at a temperature between 20 and 200° C. The etherification may be carried out in an aqueous suspension or in the presence of an inert solvent, such as alcohols and aliphatic and/or aromatic hydrocarbons. It may also be carried out in the presence of acid-binding agents, such as alkali metal amides, alkali metal alcoholates, alkali metal hydroxides, alkali metal carbonates and bicarbonates, alkali earth metal hydroxides and alkali earth metal carbonates. If an inert solvent is used, the reaction temperature is preferably the boiling point of the inert solvent.

If the compound having the Formula III above is an α,ω-dihalogen-alkinylene or -alkenylene—that is, if both Y and $R_4$ are halogen—the etherification reaction forms both the mono- and di-(2-acyl-4-aminophenoxy)-alkinylene or -alkenylene. The mono-(2-acyl-4-aminophenoxy) derivative is obtained predominantly by using a molar excess of the dihalogen compound, whereas the di-ether is obtained predominantly by using an excess of at least 1 mol of the 2-acyl-4-aminophenol reaction component.

We have found it to be particularly advantageous to carry out this etherification in an atmosphere of nitrogen in order to eliminate the oxidizing effects of the air; purer reaction products are obtained thereby.

We have further found it to be very advantageous to perform the etherification reaction in the presence of higher alcohols which are immiscible with water, such as butanol, and in the presence of an alkali metal carbonate, such as sodium carbonate or potassium carbonate. The advantages flowing therefrom are that the volume of the reaction mixture can be kept at a minimum because of the high solubility of the reactants in these higher alcohols, and that the water formed during the reaction can be continuously separated from the remainder of the reaction mixture by a water separator, so that the progress of the reaction can be closely observed and controlled. Moreover, the alkali metal carbonates act as relatively weak alkalies and therefore have a less intensive resinifying or gumming effect than the corresponding amides, alcoholates and hydroxides.

(b) By subjecting a compound having the structural formula $R_4$—H  (IV)

wherein $R_4$ has the same meaning as in Formula I, with a compound having the structural formula

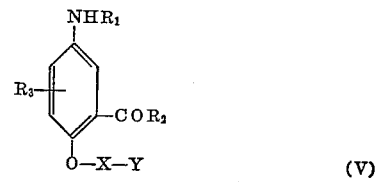

(V)

wherein $R_1$, $R_2$, $R_3$, X and Y have the same meaning as in Formula I, under the same conditions as described under (a) above.

(c) By reduction of the nitro-group in compounds having the structural formula

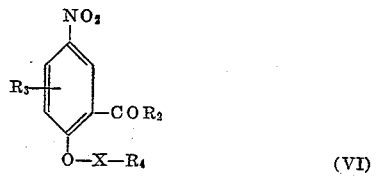

(VI)

wherein $R_2$, $R_3$, $R_4$ and X have the same meaning as in Formula I, and, to obtain compounds of Formula I wherein $R_1$ is acyl or 2-oxyacyl with 1 to 4 carbon atoms, subsequent acylation of the resulting amino-group with acylating derivatives of aliphatic carboxylic acids or of 2-hydroxy-carboxylic acids having 1 to 4 carbon atoms.

(d) By splitting off hydrogen halide from 2-acyl-4-aminophenol ethers having the structural formula

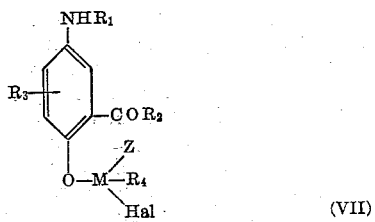

wherein $R_1$, $R_2$, $R_3$ and $R_4$ have the same meaning as in Formula I above, M is a saturated or unsaturated, straight-chain or branched-chain hydrocarbon radical with 3 to 10 carbon atoms, Z is hydrogen, chlorine, bromine or iodine, and Hal is chlorine, bromine or iodine. The hydrogen halide cleavage may be effected by reacting the compounds of Formula VII with alkalies or amines.

(e) By oxidation of alcohols having the structural formula

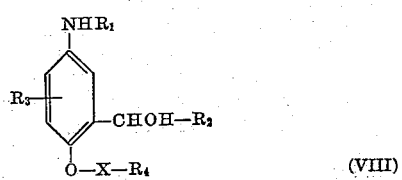

wherein $R_1$, $R_2$, $R_3$ and $R_4$ have the same meaning as in Formula I above, with a suitable oxidizing agent, such as aluminum t-butoxide.

(f) By introduction of substituent $R_3$ or a substituent capable of being transformed into a radical $R_3$, into compounds having the structural formula

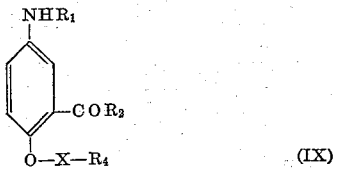

wherein $R_1$, $R_2$, $R_3$, $R_4$ and X have the same meanings as in Formula I above.

The unsaturated 2-acyl-4-aminophenol ethers of the present invention which are obtained in accordance with the methods outlined above may subsequently be transformed into the corresponding carbonyl derivatives, such as oximes, hydrazones, substituted hydrazones, semicarbazones, thiosemicarbazones, acyclic and cyclic ketals and acetals.

A few simple, saturated ethers of 2-acyl-4-aminophenols have been disclosed in the literature, for example by Kunckell, Berichte 34 (1901), pages 124 et seq.; by Mathieson, Chem. Soc. (London), 1949, pages 1133–1137; and by Marc Julia, Bull. Soc. Chim. France, 1952, pages 639–642. However, there are no disclosures in the literature regarding the therapeutic activity of these related compounds.

We have discovered that the compounds embraced by Formula I above are useful as effective antipyretic and antiphlogistic therapeutics. In addition to being far superior in their pharmacological effects to those of the 2-acyl-4-aminophenol derivatives disclosed in the prior art, the unsaturated ethers of the present invention produce substantially smaller amounts of methemoglobin in the human system than known antipyretic-analgesic therapeutics, such as phenacetin (p-ethoxy-acetanilide).

The following examples will further illustrate the present invention and enable others skilled in the art to understand the invention more completely. It should be understood, however, that we do not wish to limit the invention to the particular examples given below.

EXAMPLE I

*2-acetyl-4-acetaminophenyl-allyl ether*

16.0 gm. (0.4 mol) sodium hydroxide and 19.3 gm. (0.1 mol) 2-acetyl-4-acetaminophenol, dissolved in 100 cc. water, were heated to the boiling point on an oil bath in a three-necked flask provided with a stirrer, a reflux cooler, a nitrogen feed line and a dropping funnel, while introducing nitrogen therein. Thereafter, 18.1 gm. (0.15 mol) allylbromide were added dropwise to the boiling mixture from the dropping funnel over a period of about one hour, accompanied by vigorous stirring. During the ensuing reaction, which proceeded exothermically particularly at the beginning, the allyl ether separated out as a soft, greasy precipitate. The reaction mixture was heated for another half hour, and was then allowed to cool. The precipitate was separated by vacuum filtration and was recrystallized from alcohol containing activated charcoal. The recrystallized product was in the form of yellowish-green leaflets having a melting point of 122–123° C. The product had the structural formula

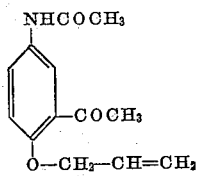

EXAMPLE II

*2-acetyl-4-acetaminophenyl-propargyl ether*

5000 cc. n-butanol, 2000 gm. (10.4 mol) 2-acetyl-4-acetaminophenol and 2200 gm. (15.95 mol) potassium carbonate were placed into a closed reaction vessel provided with a stirrer, a water separator, a reflux cooler, a nitrogen feed line and a dropping funnel. The mixture was heated to the boiling point while introducing nitrogen into the vessel, and 900 gm. (12.1 mol) propargyl chloride were then added dropwise to the boiling reaction mixture over a period of about 1½ hours from the dropping funnel; the rate of addition was such that the heat evolved by the reaction was continuously and comfortably absorbed in the reflux cooler. Once the reaction had gotten under way it was no longer necessary to introduce nitrogen into the reaction vessel, because the reaction evolved a sufficient amount of carbon dioxide to provide the inert reaction atmosphere. After all of the propargyl chloride had been added, the reaction mixture was maintained at the boiling point until 94 cc. (5.2 mol) water of condensation had separated out. Thereafter, the precipitate formed by the reaction, which consisted of potassium carbonate and potassium chloride, was filtered off while the reaction mass was still hot. The filtrate was allowed to cool, whereby a crystalline precipitate was formed. This first fraction of the reaction product was separated by vacuum filtration. The filtrate was concentrated by evaporation, yielding a second fraction of the reaction product. The first and second fractions were combined and recrystallized from 10 liters water. Since the raw crystallized product dissolved only partially in that amount of water, the mother liquor was used several times over for the purification of the raw product. In this manner the 2-acetyl-4-acetaminophenyl-propargyl ether was obtained with excellent yields in the form of flocculent, fibrous, colorless needles having a melting point of 150–152° C. The reaction product had the structural formula

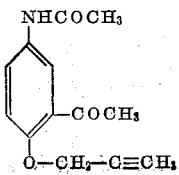

EXAMPLE III

*2-propionyl-4-acetaminophenyl-allyl ether*

500 cc. toluene, 20.7 gm. (0.1 mol) 2-propionyl-4-acetaminophenol and 69 gm. (0.5 mol) calcined potassium carbonate were placed into a three-necked flask provided with a stirrer, a reflux cooler, a nitrogen feed line and a dropping funnel. The mixture was heated to the boiling point on an oil bath, while introducing nitrogen into the flask. Thereafter, 11.5 gm. (0.15 mol) allyl chloride were added dropwise from the dropping funnel over a period of about 1 hour, accompanied by vigorous stirring. After all of the allyl chloride had been added, the reaction mixture was held at boiling point for another hour. The reaction mixture was then filtered while hot, and the filtrate was concentrated by evaporation until crystallization began. The raw reaction product which crystallized out was recrystallized from alcohol containing animal charcoal, yielding colorless needles having a melting point of 79–80° C. The reaction product had the structural formula

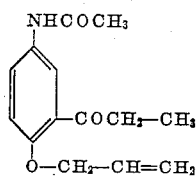

EXAMPLE IV

*2-propionyl-4-acetaminophenyl-propargyl ether*

22.4 gm. (0.4 mol) potassium hydroxide and 20.7 gm. (0.1 mol) 2-propionyl-4-acetaminophenol were dissolved in 100 cc. water, and the resulting solution was heated to the boiling point in a three-necked flask provided with a stirrer, a reflux cooler, a gas feed line and a dropping funnel, while introducing nitrogen into the flask through the gas feed line. Thereafter, 11.2 gm. (0.15 mol) propargyl chloride were added dropwise from the dropping funnel over a period of 45 minutes while vigorously stirring the reaction mixture. Subsequently, the reaction mixture was boiled for another hour. A brown, oily substance separated out during the reaction, and its precipitation was brought to completion by cooling the reaction mixture, whereby the oily substance crystallized. The crystalline raw product was recrystallized twice from benzene containing charcoal, whereupon colorless needles having a melting point of 120–122° C. were obtained. The reaction product had the structural formula

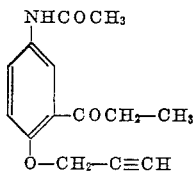

EXAMPLE V

*1,4-bis(2-acetyl-4-acetaminophenoxy)-butene-2*

A mixture of 38.6 gm. (0.2 mol) 2-acetyl-4-acetaminophenol, 40 gm. (0.29 mol) potassium carbonate and 300 cc. isopropanol was heated to the boiling point in an atmosphere of nitrogen in a three-necked flask provided with a stirrer, a reflux cooler, a gas feed line and a dropping funnel, and 21.4 gm. (0.1 mol) 1,4-dibromobutene-2 were added dropwise to the hot mixture from the dropping funnel over a period of about 20 minutes while vigorously stirring the reaction mixture. Thereafter, the reaction mixture was boiled for an additional hour. About half of the isopropanol solvent was then distilled off, and the remainder of the reaction mixture was poured into 1 liter cold water. The aqueous mixture was made distinctly alkaline with sodium hydroxide in order to dissolve unreacted 2-acetyl-4-acetaminophenol. The precipitate remaining behind was separated from the liquid phase by vacuum filtration, and the filter cake was washed with water and recrystallized from a mixture consisting of equal parts by volume of methanol and dimethylformamide. The recrystallized product had a melting point of 60° C. and the structural formula

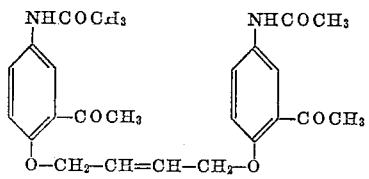

EXAMPLE VI

*2 - acetyl - 4 - acetaminophenyl - 1 - (4 - N - morpholinobutyne - 2 - yl) ether*

3 cc. morpholine were poured over 3.0 gm. 2-acetyl-4-acetaminophenyl-1-(4-chlorobutyne-2-yl) ether to form a stirrable paste. Upon warming this paste it soon changed into a clear syrup. The syrup was acidified with dilute hydrochloric acid and filtered with charcoal. The reaction product was again precipitated by adding sodium hydroxide to the filtrate. The precipitate was separated by vacuum filtration, and the filter cake was recrystallized from a small amount of water. The product was obtained in the form of white, felted needles having a melting point of 126–128° C., which were moderately soluble in water and readily soluble in hydrochloric acid. The yield was 2.5 gm. The reaction product had the structural formula

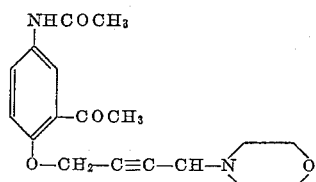

EXAMPLE VII

*2-acetyl-4-acetamino-5-methoxy-phenyl-allyl ether*

10.0 gm. 2-acetyl-4-nitro-5-methoxy-phenyl-allyl ether were dissolved in 100 cc. methanol and the solution was admixed with 5 cc. concentrated hydrochloric acid. The resulting mixture was heated to the boiling point and 6.0 gm. iron filings were added thereto while stirring the mixture. After the strong evolution of hydrogen had subsided, the reaction mixture was boiled for another four hours under reflux. It was then neutralized with alcoholic sodium hydroxide and filtered while hot to separate the hydroxide scum. The filter cake was digested three times with boiling methanol. The filtrate and the methanol from the digestion step were combined and the combined solution was concentrated by evaporation. Water was added to the concentrated solution, whereby a brown precipitate was formed which was filtered off and recrystallized from water. Crystals having a melting point of 93° C. were obtained. The crystals were dried and then admixed with acetic acid anhydride and a small amount of sodium acetate. The resulting mixture was refluxed for 15 minutes. After cooling, the mixture was poured into cold water and the precipitate formed thereby was separated by vacuum filtration and recrystallized from dilute isopropanol. White crystals having a melting point of 113–115° C. were obtained with a yield of 3.0 gm. The product had the structural formula

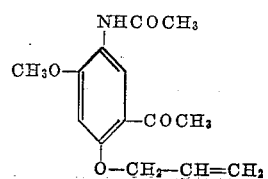

EXAMPLE VIII

2-acetyl-4-(2'-hydroxy-propionylamino)-phenyl-allyl ether

A mixture of 5.0 gm. 2-acetyl-4-acetamino-phenyl-allyl ether and 24.0 gm. syrupy anhydrous lactic acid was allowed to stand for 48 hours in a drying chamber at 50° C., whereby the initially undissolved crystals went into solution. The resulting solution was admixed with dilute sodium hydroxide, the alkaline mixture was filtered and the filter cake was washed with water until neutral. The filter cake was then recrystallized three times from benzene. Faintly yellow crystals having a melting point of 122–123° C. were obtained. The crystals were insoluble in dilute acids and alkalies. The yield was 2.8 gm. The product had the structural formula

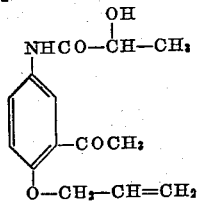

EXAMPLE IX

2-acetyl-4-acetaminophenyl-allyl ether-6-calcium sulfonate 40.0 gm. 30% oleum were placed into a round-bottom flask and cooled to 0° C. Thereafter, 10.0 gm. 2-acetyl-4-acetaminophenyl-allyl ether were added to the cold oleum in small portions so that the temperature of the reaction mixture did not increase while continuing to cool. After all of the ether had been added, the reaction mixture was stirred for one hour at 5–10° C. The reaction mixture was then poured slowly over a small amount of ice and neutralized with solid calcium carbonate. The white sludge produced thereby was heated to just below the boiling point, filtered and the filter cake was washed twice with boiling water. The filtrate and the wash water were combined and the resulting solution was evaporated in vacuo, yielding the calcium salt in the form of a yellowish-white, fluffy substance which discolored potassium permanganate and bromine. The product had the structural formula

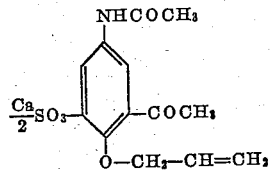

EXAMPLES X–XXXI

Using the method analogous to that described in Example II above, compounds having the general structural formula

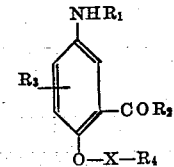

were prepared, the various substituents being listed in the following table:

| Example No. | $R_1$ | $R_2$ | $R_3$ | X | $R_4$ | Melting Point, °C. |
|---|---|---|---|---|---|---|
| X | —COCH₃ | —CH₃ | 6=Br | —CH₂—CH=CH— | H | 104–105 |
| XI | —COCH₃ | —CH₃ | 6=CH₂—CH₂—CH₃ | —CH₂—CH=CH— | H | Oil |
| XII | —COCH₃ | —CH₃ | H | —CH₂—C=CH—<br>         $\mid$<br>        CH₃ | H | 127–129 |
| XIII | —COCH₃ | —CH₃ | H | —CH₂—CH=CH— | —CH₃ | 131–132 |
| XIV | —COCH₃ | H | H | —CH₂—C≡C— | H | 168–171 |
| XV | —COCH₃ | —CH₃ | H | —CH₂—C≡C— | Cl | 138–140 |
| XVI | —COCH₃ | —CH₃ | H | —CH₂—C≡C— | —O—⟨C₆H₄⟩—NHCOCH₃ (CO—CH₃) | 252–254 |
| XVII | —COCH₃ | —CH₃ | H | —CH—C≡C—CH—<br>  $\mid$         $\mid$<br> CH₃      CH₃ | Cl | 118–120 |
| XVIII | —COCH₃ | —CH₃ | H | —CH—C≡C—CH—<br>  $\mid$         $\mid$<br> CH₃      CH₃ | —O—⟨C₆H₄⟩—NHCOCH₃ (COCH₃) | 235–237 |
| XIX | —COCH₃ | —H | H | —CH₂—CH=CH— | H | 138–140 |
| XX | —COCH₃ | —(CH₂)₃—H | H | —CH₂—CH=CH— | H | 88–89 |
| XXI | —COCH₃ | —(CH₂)₄—H | H | —CH₂—CH=CH— | H | 93–95 |
| XXII | —COCH₃ | —(CH₂)₅—H | H | —CH₂—CH=CH— | H | 74–77 |
| XXIII | —COCH₃ | —(CH₂)₆—H | H | —CH₂—CH=CH— | H | 90–91 |
| XXIV | —COCH₃ | —(CH₂)₇—H | H | —CH₂—CH=CH— | H | 85–86 |
| XXV | —COCH₃ | —(CH₂)₈—H | H | —CH₂—CH=CH— | H | 85–86 |
| XXVI | —COCH₃ | —(CH₂)₁₁—H | H | —CH₂—CH=CH— | H | 66–68 |
| XXVII | —COCH₃ | —CH₂—CH—CH₃<br>          $\mid$<br>         CH₃ | H | —CH₂—CH=CH— | H | 71–72 |
| XXVIII | —COCH₃ | —CH—CH₃<br>  $\mid$<br> CH₃ | H | —CH₂—CH=CH— | H | 86–88 |
| XXIX | —CO—CH₂—CH₃ | —CH₂—CH₃ | H | —CH₂—CH=CH— | H | 105–106 |
| XXX | H | H | H | —CH₂—C=CH—<br>         $\mid$<br>        CH₃ | H | 92–93 |
| XXXI | —CO—CH₂—CH₂—CH₃ | —CH₂—CH₂—CH₃ | H | —CH₂—CH=CH— | H | 103–104 |

While we have illustrated the present invention with the aid of various specific embodiments, it will be readily apparent to those skilled in the art that the invention is not limited to these particular embodiments, and that various changes and modifications can be made without departing from the spirit of the invention or the scope of the appended claims.

We claim:

1. Compounds having the structural formula

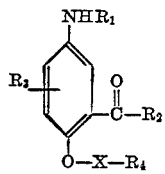

wherein $R_1$ is selected from the group consisting of hydrogen, lower alkanoyl and hydroxy-substituted lower alkanoyl, $R_2$ is selected from the group consisting of hydrogen and alkyl with 1 to 11 carbon atoms, $R_3$ is selected from the group consisting of hydrogen, halogen, lower alkyl and lower alkoxy, X is selected from the group consisting of lower alkenylene and lower alkinylene having the unsaturated bond in the $\Delta^{2,3}$ position, and $R_4$ is selected from the group consisting of hydrogen, lower alkyl, halogen, morpholino and

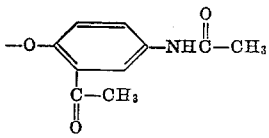

2. 2-acetyl-4-acetaminophenyl-allyl ether.
3. 2-propionyl-4-acetaminophenyl-allyl ether.
4. 2-isovaleroyl-4-acetaminophenyl-allyl ether.
5. 2-isobutyryl-4-acetaminophenyl-allyl ether.
6. 2-propionyl-4-propionylaminophenyl-allyl ether.
7. The method of producing unsaturated 2-acyl-4-aminophenol ethers of claim 1, which comprises subjecting a compound having the structural formula

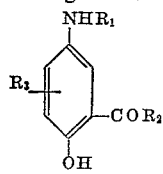

wherein $R_1$, $R_2$ and $R_3$ have the meaning indicated in claim 1, to an etherification reaction with a compound having the structural formula

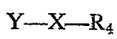

wherein X and $R_4$ have the meaning indicated in claim 1 and Y is halogen, in the presence of an acid-binding agent at a temperature between 20 and 200° C., and separating the reaction product from the reaction mass.

No references cited.